United States Patent
Dorsey

Patent Number: 5,298,105
Date of Patent: Mar. 29, 1994

[54] STRIPPER FOR REMOVING COATING FROM OPTICAL FIBERS

[75] Inventor: Carl S. Dorsey, Bethlehem Township, Northampton County, Pa.

[73] Assignee: AT&T Bell Laboratories, Murray Hill, N.J.

[21] Appl. No.: 877,005

[22] Filed: May 1, 1992

[51] Int. Cl.$^5$ .............................. B32B 35/00
[52] U.S. Cl. .................... 156/584; 156/344; 81/9.4; 29/564.4; 118/404
[58] Field of Search ............ 156/584, 344, 49, 94; 81/9.4, 9.51; 29/566.4, 564.4; 7/107; 30/90.1; 140/1, 92.1; 118/56, 125, 404, DIG. 18, DIG. 19, DIG. 21, DIG. 22

[56] References Cited

U.S. PATENT DOCUMENTS

| | | | |
|---|---|---|---|
| 3,596,540 | 8/1971 | Hooper | 81/9.5 |
| 3,997,370 | 12/1976 | Horvath, Jr. et al. | 148/12 R |
| 4,149,929 | 4/1979 | Ladany | 156/668 |
| 4,431,458 | 2/1984 | Rosen | 134/38 |
| 4,500,570 | 2/1985 | Goekler | 427/345 |
| 4,733,630 | 3/1988 | Sugimoto | 118/109 |
| 4,799,375 | 1/1989 | Lally | 73/12 |
| 4,954,152 | 9/1990 | Hsu et al. | 65/3.1 |
| 4,972,581 | 11/1990 | McCollum et al. | 30/90.1 |
| 5,033,335 | 7/1991 | Yatsu et al. | 81/9.4 |
| 5,056,185 | 10/1991 | Schotter | 15/302 |

OTHER PUBLICATIONS

Budinski, Kenneth G.; *Engineering Materials;* 1983, pp. 27-30.

Primary Examiner—David A. Simmons
Assistant Examiner—Paul M. Rivard
Attorney, Agent, or Firm—Charles E. Graves

[57] ABSTRACT

An optical fiber stripper is formed with an interior cylindrical elongate passage for housing a fiber length and for containing stripper fluid. To assure ample room for expansion of the fiber coating during stripping, the passage has a greater volume than that of the coated fiber after the coating expands from contact with the fluid. The passage has a fluid inlet at its interior end for introducing stripping fluid. A relatively sharp shoulder disposed at the interior end of the passage and formed by a short cylindrical neck section coaxial with the passage has a diameter only marginally greater than the diameter of the coated fiber. Once the coating in the passage is softened by the stripper fluid, the fiber is withdrawn allowing the shoulder to cleanly strip away the coating. Advantageously, the stripper is made from graphite, so that any incidental contact with the fiber during the draw-stripping operation has no deleterious effect on the fiber surface.

2 Claims, 3 Drawing Sheets

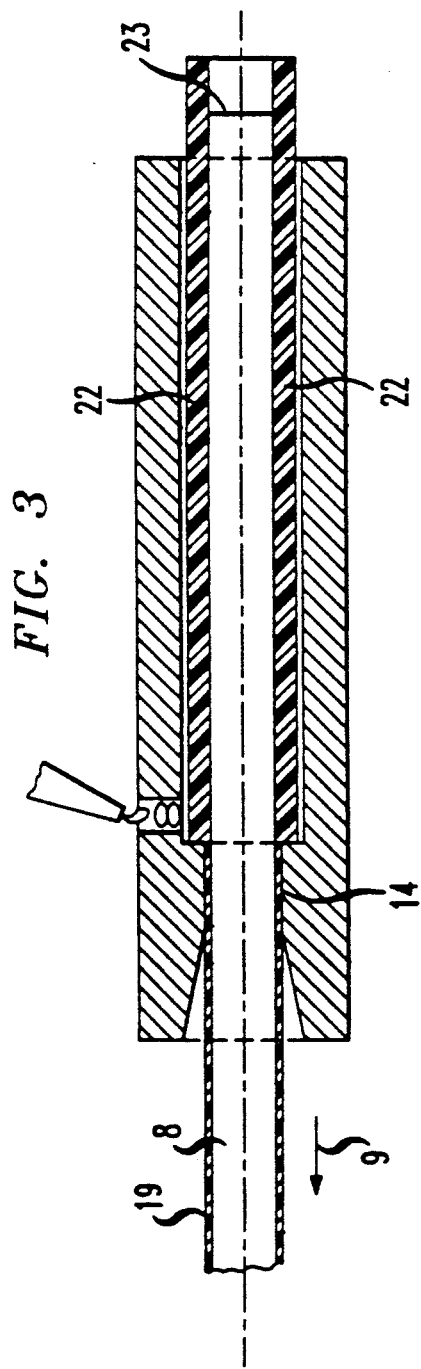
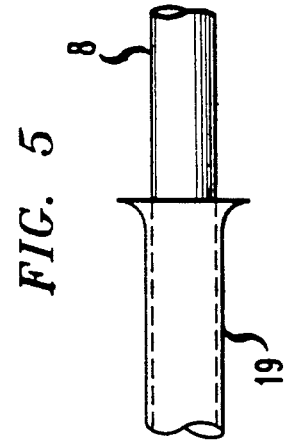
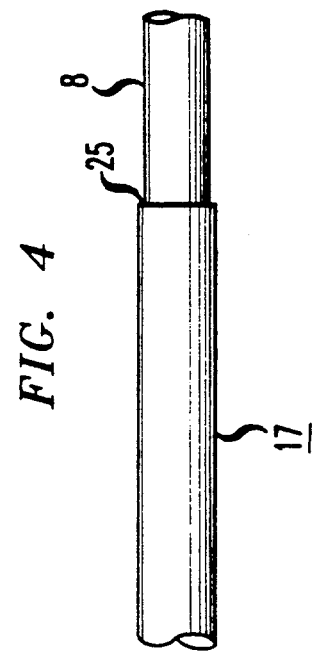
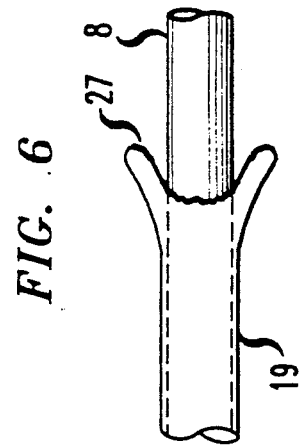

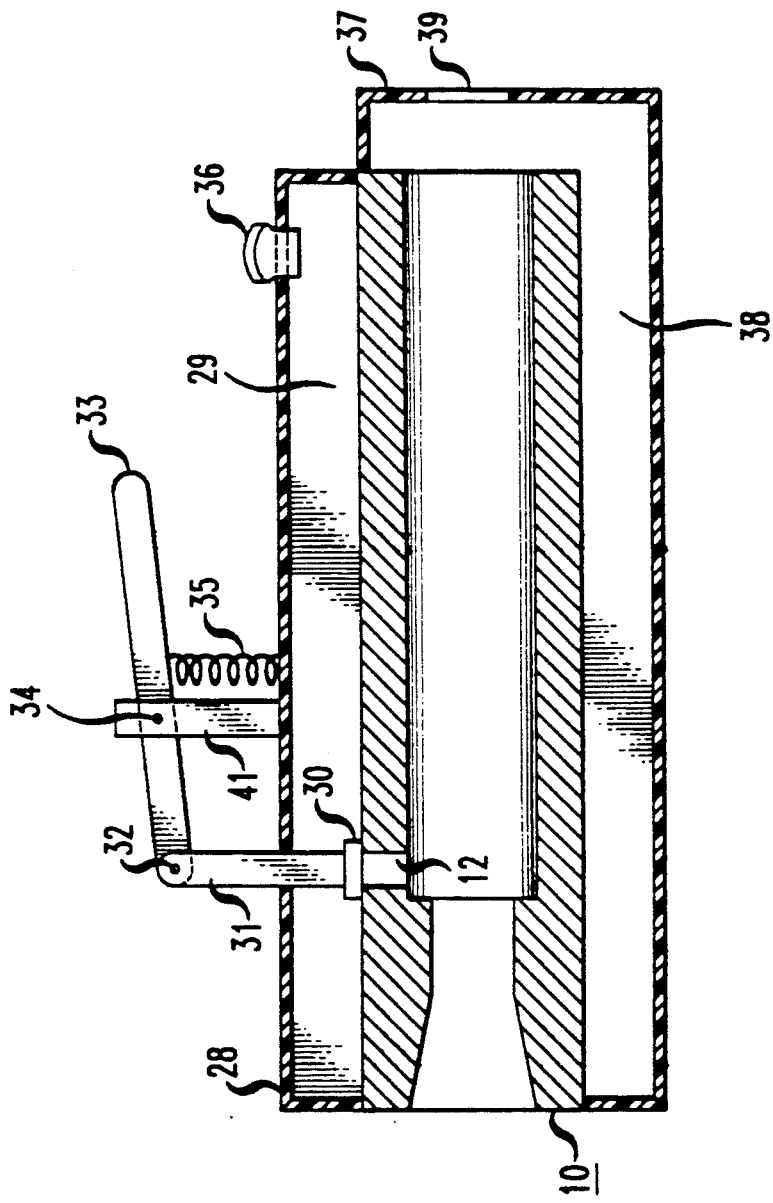

STRIPPER FOR REMOVING COATING FROM OPTICAL FIBERS

FIELD OF THE INVENTION

This invention relates to the forming of optical fiber splices and particularly to fiber coating striping devices useful in assuring high-strength splices.

BACKGROUND OF THE INVENTION

In the art of optical fiber splicing, it is increasingly necessary to make splices of reliably high strength in strands of optical fiber cable. Splicing entails having to remove the existing protective coating from the fiber prior to splicing. One prior art stripping device consists of a body with an elongate passage in which the coated fiber is placed. A stripping fluid such as acetone is flowed into the passage to loosen the coating. As the fiber is drawn thereafter out of the passage, interior surfaces within the passage appropriately sized and located strip the coating from the fiber.

One disadvantage of this type of stripper is that the passage geometry as well as the choice of stripper material can cause scoring or scratching of the fiber's surface as the bare glass fiber without its coating is removed from the passage. The scoring can significantly decrease the strength of the fiber in the region of the score, with the result that the splice creates a weak point in the fiber that can fail under tensile stress. Another drawback is that no provisions are made for a clean, planar demarcation between the stripped coating and the coating remaining on the fiber. If the stripping results in a ragged or uneven coating termination, a proper recoating of the fiber following splicing is difficult to achieve.

As a further result, in many prior situations where it is necessary to closely control the location at which the coating ends and the bare fiber is exposed for splicing, the control is not handily available.

One material frequently used in prior art draw-through type strippers is glass. Glass, however, cannot be formed into a stripper by simple processes such as machining. Further, glass because of its relative hardness has a tendency to place scores on the surface of the glass fiber during the draw-through step.

SUMMARY OF THE INVENTION

An optical fiber stripper is formed with an interior cylindrical elongate passage for housing the fiber length which is to be stripped of its coating. To accommodate the swelling of the fiber coating during the stripping process, the passage is formed to have a greater volume than the volume of the coated fiber when it swells following application of stripper fluid. The passage has a feeder inlet at its interior end for introducing stripping fluid. A relatively sharp shoulder marks the interior end of the passage. The shoulder is formed as a short cylindrical neck coaxially disposed with respect to the passage and has a diameter only slightly greater than that of the coated fiber before strip fluid is applied.

When the stripping fluid has softened the coating, the fiber is withdrawn or backed out of the passage, thereby passing the fiber back through the neck, where the shoulder strips away the softened coating. The stripped coating is left behind in the passage and may be disposed of thereafter.

Advantageously, the stripper is fabricated from a graphite or compositionally similar material so that any incidental contact with the fiber during the draw-stripping operation has no deleterious effect on the fiber surface. Graphite has the further advantage of being easily machine-formed.

A splicing apparatus employing the invention may advantageously utilize a methylene chloride fiber jacket stripping liquid to remove the coating. Advantageously, the apparatus may be provided with a reservoir for the stripper fluid and a separate reservoir for spent fluid.

DESCRIPTION OF THE DRAWING

FIG. 3 is sectional side view of the body element showing insertion of stripper fluid and consequent swelling of the coating;

FIG. 4 is a perspective view of a fiber stripped of coating in accordance with the invention;

FIGS. 5 and 6 are perspective views of prior art stripped fibers; and

FIG. 7 is a perspective view of a variation of the invention.

DETAILED DESCRIPTION OF AN ILLUSTRATIVE EMBODIMENT

Figure 1:
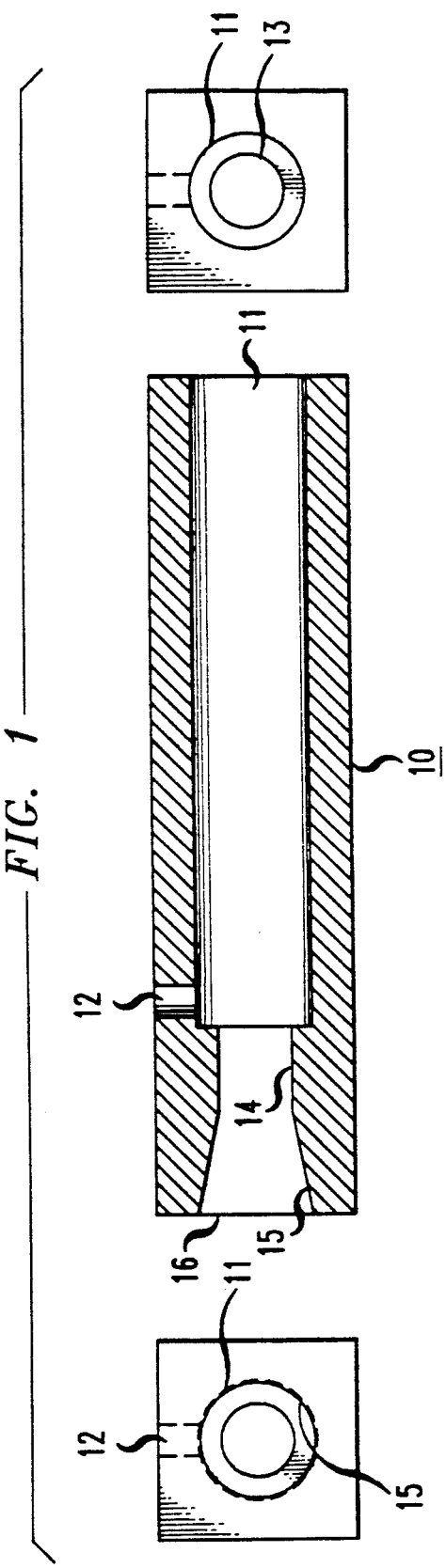
FIG. 1 is a sectional side view of a stripper body element with end views thereof.

As seen in FIG. 1, the stripper designated 10 is an elongate body with a through-passage 11 which may be circular in cross-section, formed in the interior of body 10 beginning at its first end and culminating in a shoulder 13. Adjacent to the shoulder 13 is an inlet 12 from the exterior of body 10 joining with passage 11, for introducing stripper fluid. The passage 11 has a diameter that readily accommodates the expansion of the fiber coating when stripper fluid is applied.

Shoulder 13 is formed by providing a neck 14 which is circular in cross-section and coaxial with respect to passage 11. Neck 14 has a diameter only slightly greater than the diameter of the fiber which it receives so that stripper fluid cannot flow into the neck region. The length of neck 14 is relatively short. The remainder of the fiber passage is a tapered section 15 which forms a flared entrance for inserting a coated fiber.

By way of example, to accommodate and restrict a coated optical fiber having an outside diameter of 0.0095 inches, the diameter of neck 14 is fixed at 0.010 inches. The length of neck 14 may be set at from 0.020 to 0.040 inches. The entrance to the tapered section 15 is set at about 0.050 inches or somewhat greater, for ease of fiber insertion. The diameter of passage 11 is set at about 0.060 inches to provide volume for the swelling of the coating while leaving ample clearance between the coating and the interior wall of passage 11.

Figure 2:
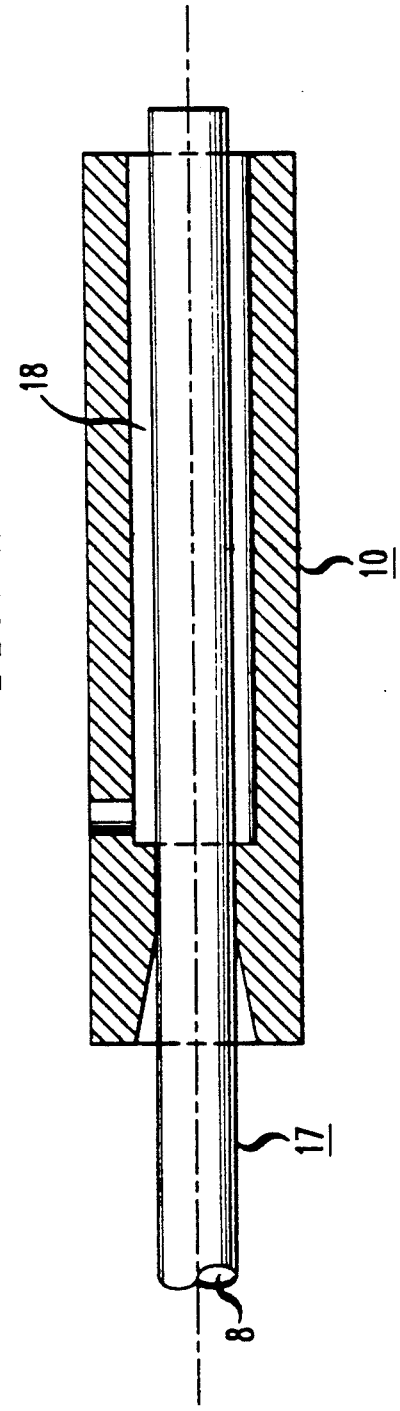
FIG. 2 is a sectional side view of the body element containing a coated fiber to be stripped.

Referring to FIGS. 2 and 3, the end of an optical fiber 17 with a coating 19, which may for example be a polyurethane acrylate, is inserted into the entrance of the tapered section 15. The fiber travels through the narrow neck 14 into passage 11 and marginally out the far end of body 11. Stripper fluid such as methylene chloride or acetone (the choice being dependent on the coating material) is applied into the inlet 12. Application may be by an eye-drop applicator 21 as seen in FIG. 3. The fluid, designated 40, surrounds the coating 19, causing the contacted portion 22 to expand. In the process, the coating looses its adherence to the underlying glass core 8. The expanding coating also extends beyond the end 23 of the core 8.

In accordance with the invention, because of the constriction afforded by neck 14 relative to inserted coated fibers, the fluid does not significantly migrate to the coating contained within in neck 14. This assures that the coating within neck 14 will remain unaffected and relatively stiff. When the coating 22 in the passage 11 is sufficiently softened, the fiber 17 is withdrawn by keeping body 10 stationary and pulling fiber 17 in the direction of arrow 9 as seen in FIG. 3. Once the swollen coating is stripped from the core 8, it may be removed from passage 11 by, for example, using tweezers to grip the exposed end shown in FIG. 3 as protruding from passage 11. The coating comes off as one continuous piece that may be easily removed and discarded.

Since the swollen fiber coating is larger than the 0.010 inch diameter of neck 14 in this example, a very abrupt and clean interface results from the stripping process. Thus, whenever it is necessary to closely control the location at which the coating ends and the bare glass is exposed for splicing, the present invention provides an apparatus for achieving same.

The resulting stripped fiber is illustrated in FIG. 4 as having a clean, planar lateral face 25. By way of contrast to prior art stripped fibers, the fiber of FIG. 4 does not have an undesirable bulge such as bulge 26 depicted in FIG. 5 or peeling such as peels 27 shown in FIG. 6. Either of these configurations will result in imperfect recoatings of the glass core after splicing.

Following the stripping, pressurized air may be blown into the tapered section 15 to clean the passage 11. The fiber may be treated conventionally with a rinse, using a squirt bottle of iso-propanol. Rinsing should occur before and after cleaving of the fiber preparatory to splicing. The fiber is then placed in a splicing fixture (not shown) where fusing of the fiber to a similarly stripped fiber is done. Thereafter a re-coat of fiber coating is applied over the splice.

As noted, the material of the present invention in its preferred embodiment is graphite. The graphite useful in the invention advantageously, although not necessarily, is characterized by a Shore Hardness of from 73 to 76 to prevent the material of the body 10 from abrading or scoring the surface of the glass fiber during the withdrawal step.

In a specific application of the invention, it may be desirable to combine body 10 with a source of stripping fluid and a means for containing spent fluid. Accordingly, as seen in FIG. 7, a suitably formed tank 28 is provided around the fluid inlet 12 to create a reservoir 29 for stripper fluid. The tank 29 is equipped with a fluid supply hole covered by a cap 36. A stopper 30 fastened to the end of stopper arm 31 normally covers the entrance to inlet 12. Arm 31 is actuated, for example, by moving control lever 33 against its biasing spring 35. The mounting of lever 33 is conventionally achieved as with a brace 41 and pivot pins 32, 34. Movement of lever 33 downward raises stopper 30, allowing fluid to enter the passage 11.

Spent fluid may be captured in the tank 37 which forms a separate reservoir 38 on the side of body 10 opposite to tank 28. The fluid runs off from the chamber of passage 11 and into reservoir 38 following removal of the fiber 17 and the extraction of the stripped coating from the passage 11. The spent fluid may be discarded through relief hole 39. Designers will readily envision variations of and improvements on the basic ideas of FIG. 7, which essentially provide a convenient supply of stripping fluid and a useful catch basin for spent fluid which diminishes the risk of a human user coming into contact with the usually harmful fluid.

The stripper of the present invention may be used as part of a fixed stripping station equipped with fiber chucks, splicing fixtures and re-coat jigs; or alternatively, may be used as a portable tool. Excellent results may be achieved without the use of relatively expensive and time-consuming ultrasonic cleaning steps.

I claim:

1. Apparatus for stripping coating from an optical fiber, comprising:
    a body comprising an elongate interior passage having an interior end for receiving a fiber length and for receiving stripping fluid;
    said passage having a substantially greater volume than that of the coated fiber after said coating expands following application of stripper fluid;
    inlet means for injecting stripping fluid into said passage;
    a first reservoir mounted on said body and communicating with said inlet means, for containing a supply of stripper fluid;
    means for flowing a measured amount of said fluid from said first reservoir into said passage; and
    a cylindrical neck formed at said interior end of said passage and having a diameter only slightly greater than that of said coated fiber;
    the entrance to said neck forming a relatively sharp shoulder at said interior end;
    whereby when a received fiber is withdrawn from said passage said shoulder strips away expanded fiber coating.

2. Apparatus in accordance with claim 1, further comprising:
    a second reservoir mounted on said body and communicating with said passage, for receiving spent fluid from said passage.

* * * * *